US008403258B2

(12) United States Patent
Arendt et al.

(10) Patent No.: US 8,403,258 B2
(45) Date of Patent: Mar. 26, 2013

(54) POWER REGULATING DEVICE FOR AN AIRCRAFT

(75) Inventors: Martin Arendt, Meine (DE); Lars Frahm, Hamburg (DE); Andreas Westenberger, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 657 days.

(21) Appl. No.: 12/563,000

(22) Filed: Sep. 18, 2009

(65) Prior Publication Data
US 2010/0071371 A1 Mar. 25, 2010

Related U.S. Application Data

(63) Continuation of application No. PCT/EP2008/053362, filed on Mar. 20, 2008.

(60) Provisional application No. 60/895,793, filed on Mar. 20, 2007.

(30) Foreign Application Priority Data

Mar. 20, 2007  (DE) .......................... 10 2007 013 345

(51) Int. Cl.
B64D 27/00 (2006.01)
(52) U.S. Cl. ........................................ 244/53 R; 244/58
(58) Field of Classification Search ................ 244/53 R, 244/58, 60; 903/908
See application file for complete search history.

(56) References Cited

U.S. PATENT DOCUMENTS

| 5,541,014 | A  | * | 7/1996  | Micheli et al. ................ 429/415 |
| 6,296,957 | B1 | * | 10/2001 | Graage ......................... 429/425 |
| 7,364,116 | B2 |   | 4/2008  | Nguyen et al. |
| 7,463,949 | B2 |   | 12/2008 | Tani et al. |
| 7,520,350 | B2 | * | 4/2009  | Hotto .......................... 180/65.25 |
| 7,743,861 | B2 | * | 6/2010  | Grieve ......................... 180/65.31 |
| 7,828,244 | B2 |   | 11/2010 | Heinrich et al. |
| 7,954,753 | B2 | * | 6/2011  | Hoffjann et al. ............ 244/53 R |

(Continued)

FOREIGN PATENT DOCUMENTS

| DE | 100 31 864 C1 | 6/2000 |
| DE | 199 30 876 A1 | 1/2001 |

(Continued)

OTHER PUBLICATIONS

German Office Action for German Application No. 10 2007 013 345.8-32 mailed Sep. 24, 2010.

(Continued)

Primary Examiner — Christopher P Ellis
(74) Attorney, Agent, or Firm — Ingrassia Fisher & Lorenz P.C.

(57) ABSTRACT

A power regulator and a process regulator, or a power regulating device for regulating hybrid energy sources are provided for an aircraft. The power regulator and process regulator is equipped such that the requirement of a required means of a consumer is measurable. In this arrangement the power regulating device is equipped such that a first operating characteristic of a first energy source and a second operating characteristic of a second energy source are determinable. By means of the first energy source a first requirement share can be generated, and by means of the second energy source a second requirement share of the required means can be generated. The power regulating device can regulate the first energy source and the second energy source such that depending on the first operating characteristic and on the second operating characteristic the first requirement share and the second requirement share of the required means can be provided to the consumer.

14 Claims, 5 Drawing Sheets

U.S. PATENT DOCUMENTS

| | | | |
|---|---|---|---|
| 8,016,228 | B2 | 9/2011 | Fucke et al. |
| 8,118,253 | B1 * | 2/2012 | Casado Abarquero et al. . 244/58 |
| 2002/0164510 | A1 | 11/2002 | Brueck et al. |
| 2003/0075643 | A1 | 4/2003 | Dunn |
| 2003/0111908 | A1 | 6/2003 | Christensen |
| 2003/0151309 | A1 | 8/2003 | Hutton |
| 2003/0207164 | A1 | 11/2003 | McElroy et al. |
| 2004/0038092 | A1 | 2/2004 | Scholta et al. |
| 2004/0061380 | A1 | 4/2004 | Hann et al. |
| 2004/0124308 | A1 * | 7/2004 | Daggett ............ 244/58 |
| 2005/0067902 | A1 | 3/2005 | Bemat et al. |
| 2005/0103931 | A1 * | 5/2005 | Morris et al. ......... 244/58 |
| 2006/0085100 | A1 | 4/2006 | Marin-Martinod et al. |
| 2006/0138278 | A1 | 6/2006 | Gans |
| 2006/0237583 | A1 * | 10/2006 | Fucke et al. .......... 244/58 |
| 2008/0001026 | A1 | 1/2008 | Hoffjann et al. |
| 2008/0143186 | A1 | 6/2008 | Wisch et al. |
| 2010/0071371 | A1 | 3/2010 | Arendt et al. |
| 2012/0025032 | A1 * | 2/2012 | Hopdjanian et al. ....... 244/53 R |

FOREIGN PATENT DOCUMENTS

| | | | |
|---|---|---|---|
| DE | 101 42 125 | A2 | 3/2003 |
| DE | 10252292 | A1 | 6/2004 |
| DE | 102004044646 | A1 | 3/2006 |
| DE | 102004058430 | A1 | 6/2006 |
| EP | 1099630 | A2 | 5/2001 |
| EP | 1560311 | A1 | 8/2005 |
| GB | 2340890 | A | 3/2000 |
| JP | 10040360 | A | 2/1998 |
| JP | 2001334998 | A | 12/2001 |
| JP | 2002046696 | A | 2/2002 |
| JP | 2007015423 | A | 1/2007 |
| RU | 2122764 | C1 | 11/1998 |
| RU | 2232109 | C1 | 7/2004 |
| WO | 2004037641 | A2 | 5/2004 |
| WO | 2006077088 | A1 | 7/2006 |
| WO | 2007001366 | A2 | 1/2007 |

OTHER PUBLICATIONS

Russian Patent Office, Russian Notice of Allowance dated Apr. 26, 2012 for Russian Patent Application No. 2009138414.

Japanese Patent Office, Japanese Patent Office Action for Application No. 2010500231, dated Nov. 21, 2012.

* cited by examiner

POWER REGULATING DEVICE FOR AN AIRCRAFT

CROSS-REFERENCE TO RELATED APPLICATION

This application is a continuation of International Application No. PCT/EP2008/053362, filed Mar. 20, 2008, and which claims priority to German Patent Application No. 102007013345.8 filed Mar. 20, 2007 and of U.S. Provisional Patent Application No. 60/895,793 filed Mar. 20, 2007, the disclosure of which applications is hereby incorporated herein by reference.

TECHNICAL FIELD

The present invention relates to a power regulating device or a power regulator and process regulator for regulating hybrid energy sources for an aircraft, an energy system for an aircraft, to a method for regulating hybrid energy sources for an aircraft, to the use of a power device in an aircraft, and to an aircraft comprising a power device.

BACKGROUND

In modern aircraft there is an increasing use of various energy sources in order to take some of the load off the engine generators of the aircraft, thus reducing kerosene consumption. For example alternative energy sources, such as solar cells, fuel cells or batteries can be used.

A further approach in modern commercial aircraft consists of making further use of the products or additional products of the energy sources, for example of waste heat, so as to in this way make the energy system and resources system of an aircraft more efficient.

SUMMARY

It is an object of the present invention to improve the efficiency of a hybrid energy generating system.

This object is met by a power regulating device (i.e. an energy regulating device) for regulating hybrid energy sources for an aircraft, by an energy system for an aircraft, by a method for regulating hybrid energy sources for an aircraft, by the use of a power regulating device, and by an aircraft comprising a power regulating device with the characteristics according to the independent claims.

According to an exemplary embodiment of the invention, a power regulating device (or energy regulating device) for regulating hybrid energy sources for an aircraft is created. The power regulating device is adapted such that the requirement of a required means of a consumer is measurable. Furthermore, the power regulating device is adapted such that a first operating characteristic of a first energy source and a second operating characteristic of a second energy source are determinable. By means of the first energy source a first requirement share can be generated, and by means of the second energy source a second requirement share of the required means can be generated. The power regulating device further controls the first energy source and the second energy source such that depending on the first operating characteristic and on the second operating characteristic the first requirement share and the second requirement share of the required means can be provided to the consumer.

According to a further exemplary embodiment of the invention, an energy system for an aircraft is created. The energy system comprises a power device as described above, at least one consumer, a first energy source with a first operating characteristic and a second energy source with a second operating characteristic. The power regulating device is adapted such that a requirement of a required means of the consumer is measurable. The power regulating device is adapted such that the first operating characteristic and the second operating characteristic are determinable. By means of the first energy source a first energy share and by means of the second energy source a second energy share of the required means can be generated. The power regulating device controls the first energy source and the second energy source such that depending on the first operating characteristic and on the second operating characteristic the first requirement share and the second requirement share of the required means are provided to the consumer.

According to a further exemplary embodiment, a method for regulating hybrid energy sources for an aircraft is created. The requirement of a required means of a consumer is measured by means of a power regulating device. By means of the power regulating device a first operating characteristic of a first energy source and a second operating characteristic of a second energy source are determined. A first requirement share of the required means is generated by means of the first energy source, and a second requirement share of the required means is generated by means of the second energy source. By means of the power regulating device the first energy source and the second energy source are controlled such that depending on the first operating characteristic and on the second operating characteristic the first requirement share and the second requirement share of the required means are provided to the consumer.

According to a further exemplary embodiment, the power regulating device described above is used in an aircraft.

According to a further exemplary embodiment, an aircraft with a power regulating device as described above is created.

The term "required means" refers to a means that the consumer requires and that at the same time can be produced or provided by an energy source. In this arrangement an energy source may produce a requirement share of the required means, and the requirement of a required means may comprise the sum of all the requirement shares. A requirement share may, for example, meet the entire requirement of the required means or it can meet only a part thereof.

The term "operating characteristic" of an energy source refers to the general characteristics of an energy source. The term "operating characteristic" of an energy source may, for example, refer to the ratio of educts to products or required means. The operating characteristic is, for example, determined by the quantity of educts fed in, and by the quantity of products delivered, for example electrical power, thermal energy or other products, for example from fuels. Furthermore, environmental conditions such as pressure, temperature or atmospheric moisture can have an effect on the operating characteristic. By means of the operating characteristic it is also possible to determine the efficiency of a device or of an energy source. The best efficiency is achieved at the work point or operating point at which from a given quantity of educts the largest quantity of desired products, for example electrical power, can be achieved.

With the power regulating device for controlling hybrid energy sources different types of energy sources may be combined with the objective of achieving improved interaction in relation to electrical efficiency or in relation to the additional products of the individual energy sources. This is implemented by means of the power regulating device, which can determine the operating characteristics of the individual energy sources and from them can request a required means from that energy source which provides better efficiency under the given boundary conditions. It may thus be possible to supply to consumer systems various types of required means that are provided by the energy sources. In this arrangement the efficiencies of the generating systems or of the energy sources at a particular point in time under certain conditions are taken into account. For example, an electrical alternating-current system can be supplied with alternating current, wherein the electrical power is, for example, generated from the mechanical energy of an aircraft engine by means of a generator when said aircraft engine has better temporary electrical efficiency. The power regulating device thus coordinates and controls both production and distribution of the required means, taking into account the operating characteristics or the efficiencies of all the energy sources or generating systems.

According to a further exemplary embodiment, the power regulating device is adapted such that depending on the flight phase the first operating characteristic and the second operating characteristic are determinable. The power regulating device recognizes, for example, with reference to the flight state and the operating characteristic, that an engine (power plant) as an energy source provides better efficiency when cruising than when on the ground. Accordingly, when the aircraft is operated on the ground the power regulating device will not request any required means from the power plants, because on the ground more educts are used (i.e., the consumption of educts is higher). The power regulating device thus receives its required means from some other energy source that on the ground under the given environmental conditions has a better operating characteristic or better efficiency. In this way the efficiency of an energy system may be improved.

According to a further exemplary embodiment, the power regulating device is adapted such that the requirement for a required means of a further consumer is measurable. The power regulating device controls the first energy source and the second energy source such that depending on the first operating characteristic and on the second operating characteristic the first requirement share and the second requirement share of the required means can be provided to the further consumer. This may make it possible for the power regulating device to supply the respective required means to a multitude of further consumers, in that the power regulating device regulates the first energy source and the second energy source in a targeted manner.

According to a further exemplary embodiment, the power regulating device is adapted such that in each case priority can be accorded to the consumer and to the further consumer. Furthermore, the power regulating device is adapted such that depending on the priority, for example in the case of insufficient availability of a required means, the required means can be supplied in sequence to the consumer and to the further consumer. For example, priority can be accorded taking account various factors, for example flight safety or passenger comfort, or it can be associated with a flight phase. For example, if several consumers require water as a required means when water is not available in sufficient quantity, the water generated by the energy sources can first be provided to the consumer that has been accorded higher priority rather than to the consumer with lower priority. For example, it may be more important to provide water for flushing the toilet than water for supplying the hand basin.

According to a further exemplary embodiment, priority can also be accorded taking into account flight safety. For example, flight safety factors may first include those consumers that are essential to flight operations of an aircraft, wherein, for example, consumers that contribute to passenger comfort have lower priority. During trouble-free operation the energy sources provide the required means, for example electricity, at the same time to each consumer that demands electricity. In an emergency situation or during partial loss of an energy source the consumer having highest priority is first supplied with the required means, in the present case electricity. If additional quantities of the required means, in the present case electricity, can be provided by the energy sources, it is supplied to the consumers with the next higher priority levels. Furthermore, the power regulating device can also prioritize the various required means or the required means and the further required means. Furthermore, the power regulating device can also prioritize the individual products, in other words the required means and the further required means, of the first energy source and of the second energy sources. For example, a fuel cell as an energy source can provide electrical power, thermal energy, water and low-oxygen outgoing air as required means. Depending on the priority accorded to the consumers, the power regulating device can provide these required means to the consumers. It may thus be possible to ensure operation of safety-relevant equipment or consumers.

According to a further exemplary embodiment, the power regulating device is adapted such that by means of the control of educts from one of the first energy sources and second energy sources the first requirement share and the second requirement share of the required means can be set. By means of controlling the educts of an energy source, for example the provision of oxygen supply and hydrogen supply to a fuel cell, the products, for example electrical power, water or low-oxygen outgoing air, may be controlled.

According to a further exemplary embodiment, the required means are selected from the group comprising electrical power and additional products. The additional products can be selected from the group comprising water, thermal energy and low-oxygen outgoing air. For example, the power regulating device can regulate an energy source for generating thermal energy and can provide it to the consumer that requires this thermal energy.

According to a further exemplary embodiment, the at least one first energy source or second energy source is a fuel cell system.

According to a further exemplary embodiment, the fuel cell system comprises a compressor. The compressor is adapted to control or regulate the oxygen supply of the fuel cell system. The power regulating device is adapted to control or regulate the compressor. In this way the power regulating device can regulate the fuel cell output based on the requirement of the required means of the consumers. By way of controlling the educts, a multitude of products may be set. For example, in the case of an increased supply of oxygen, apart from the electrical power the production of water and inert gas products of a fuel cell may also be regulated. The output of a fuel cell is determined by the electrical power required by the consumers. The required output may be varied in order to regulate the production of inert gas or water. At a constant electrical output it may then be possible, for example, by means of the lambda value to influence the ratio of oxygen provided to oxygen required, the oxygen content, and to a small extent the air mass flow of the inert gas, as well as the production of water. The electrical output may remain unchanged in the above.

According to a further exemplary embodiment, the at least one first energy source or second energy source is a power plant generator.

According to a further exemplary embodiment, the at least one first energy source or second energy source is selected from the group comprising batteries, electrical direct-current motors, electrical alternating-current generators, storage batteries and solar cells.

According to a further exemplary embodiment, at least the first consumer and the further consumer are selected from the group comprising electrical direct-current systems, electrical alternating-current systems, water consumers, inerting systems and wing anti-icing systems.

The exemplary embodiments of the power regulating device also apply to the method and to the energy system, as well as to the aircraft and to the use of the power regulating device and vice versa.

One aspect of the invention thus consists of providing a power regulating device for a hybrid electrical power generating system whose energy source comprises, for example, power plant generators, batteries and/or fuel cell systems. In this way the interaction of the individual energy sources, for example the power plant generators, batteries and fuel cell systems, can be improved and optimized as far as generating electrical power is concerned. Likewise, the additional products, for example low-oxygen outgoing air or water, which products arise in this process, can be fed to the consumers. Taking into account the operating characteristic, the power regulating device can, for example, administer low-oxygen outgoing air of energy sources such as fuel cells, thus ensuring inerting of the fuel tank or of the cargo hold as consumers. Furthermore, the power regulating device can for example regulate as an additional product thermal energy from the energy sources, thus ensuring, for example, the thermal supply of a wing anti-icing system.

Based on its knowledge of the operating characteristic of the energy sources, the power regulating device may improve the interaction and the efficiency of said energy sources. For example, based on the determined requirement of the consumers, the power regulating device can regulate that energy source which can provide the required means most efficiently and most economically in relation to kerosene consumption. For example, if the aircraft is on the ground, power plants produce electrical power less efficiently than does, for example, a fuel cell, because the power plants are not primarily designed for generating electrical power but instead for generating thrust in flight. The power regulating device would recognize this with reference to the operating characteristic and would thus obtain the electrical power from a fuel cell system because the efficiency or the operating characteristic of the fuel cell is better than that of the power plants. In other words, there is a reduced consumption of educts, for example fuels, so that the energy efficiency of the overall system is improved. Furthermore, due to prioritization of the individual consumers or of the required means the use of the required means can be controlled so that the energy supply to the systems having higher priority may be ensured.

Taking into account the operating characteristic of hybrid electrical power generating systems or energy sources, the power regulating device may provide more favorable control from the point of view of energy consumption. Furthermore, the power regulating device may administer all the by-products or additional products of the energy sources and can provide them to consumers. For example, in the case where an energy source is a fuel cell system, the use of any by-products or additional products that arise, for example thermal energy, water and low-oxygen outgoing air, can be administered and provided to the consumers. Consumers can be served according to the priority accorded to them so that, for example, aspects of operational safety of the aircraft on the ground and in flight are taken into account. Furthermore, depending on the flight phases, the power regulating device can put the energy sources into operation or can control or regulate their educts. For example, in proximity to airports, where the emissions and the noise levels of the power plants are to be reduced, less-polluting and quieter energy sources may be used in order to reduce pollutant emissions in this way.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
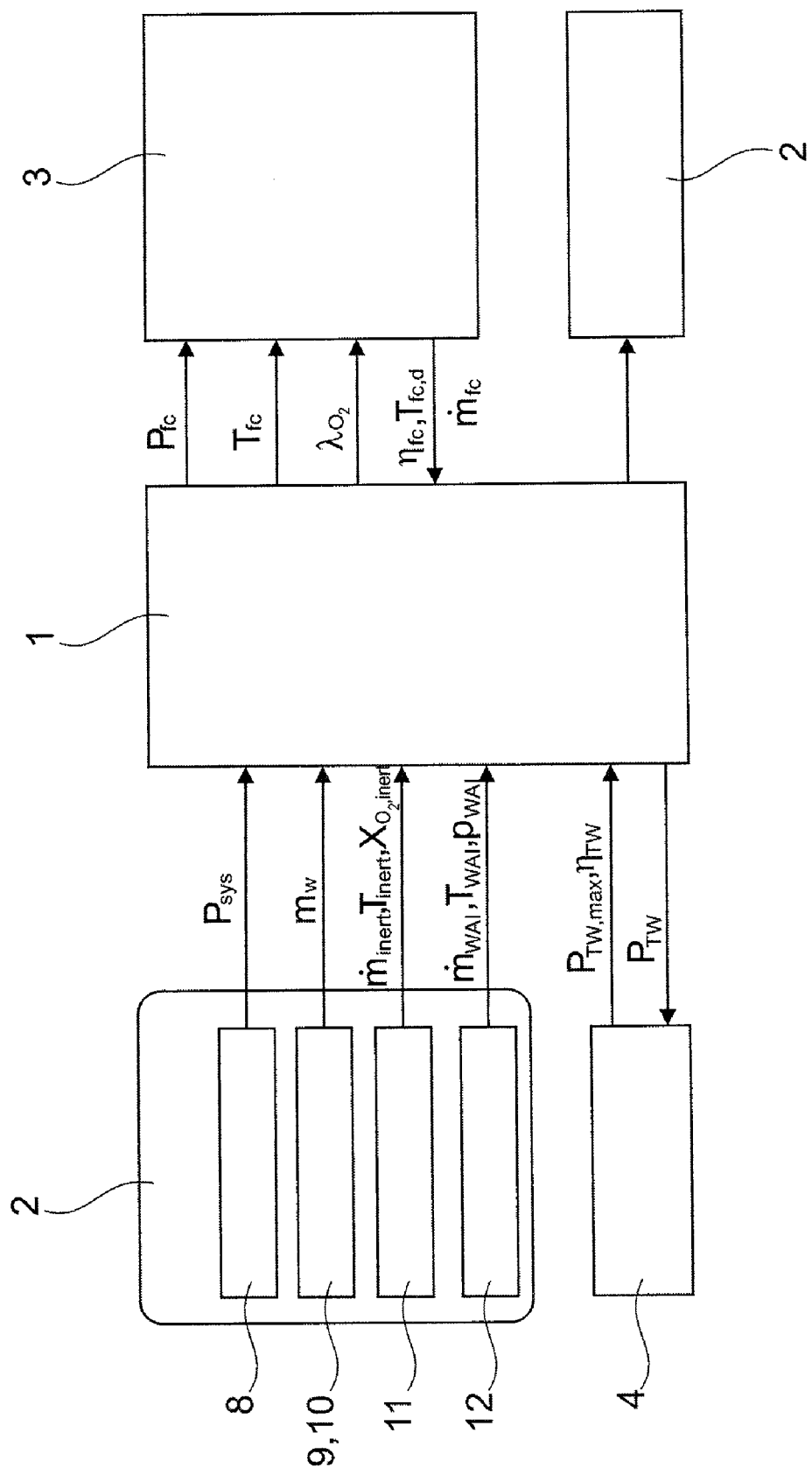
FIG. 1 a diagrammatic view of the power regulating device of an exemplary embodiment of the invention.

FIG. 1 shows an exemplary embodiment of the power regulating device. The power regulating device 1 is equipped such that the requirement of a required means is measurable. Furthermore, the power regulating device 1 is equipped such that a first operating characteristic of a first energy source 3 and a second operating characteristic of a second energy source 4 are determinable. By means of the first energy source 3 and by means of the second energy source 4 a first requirement share and a second requirement share of the required means can be generated. In this arrangement the power regulating device 1 controls the first energy source 3 and the second energy source 4 such that depending on the first operating characteristic and on the second operating characteristic the first requirement share and the second requirement share of the required means may be made available to the consumer 2.

The power regulating device 1 can, for example, by means of sensors or other data transmission means, measure the required means of the consumers 2. Consumers 2 can, for example, comprise inerting systems 11, direct-current systems 8, alternating-current systems 8, wing anti-icing systems 12, or water systems 10. An electrical system 8 requires, for example, electrical power PSys as a required means. A water system 10 requires, for example, a water mass flow mw, while an inerting system requires low-oxygen outgoing air of a particular temperature Tinert, and a particular mass flow of a particular oxygen content XO2, inert. Furthermore, an anti-icing system 12 can be supplied with a mass flow of a particular temperature TWAI and of a particular pressure pWAI. On the other hand the power regulating device can determine and measure the operating characteristic of a first energy source 3 and of a second energy source 4.

In the exemplary embodiment shown in FIG. 1, the first energy source is, for example, a fuel cell system 6, and the second energy source 4 is engine generators 7. The power regulating device can, for example, determine the operating characteristic of the first and second energy sources 3, 4, 4, 7 by way of measured data relating to the flow intensity or the current density, or by predetermined manufacturer data. For example, the power regulating device 1 can measure, from the fuel cell, an efficiency $\eta fc$, an output Pfc,d and a mass flow of the products of the fuel cell, for example water or low-oxygen outgoing air. As far as the engines 7 are concerned, the power regulating device knows, for example, the maximum electrical power Ptw,max, and the electrical efficiency $\eta tw$ of the engine can be calculated at certain ambient conditions, for example at atmospheric pressure. Depending on the requirement of required means of the consumers 2, 5 and of the operating characteristics of the first and second energy sources 3, 4, 6, 7, the power regulating device can control or regulate the first and second energy sources 3, 4, 6, 7 such that each energy source 3, 4, 6, 7 provides a first and second requirement share of the required means in order to in this way adequately supply the consumers 2, 5.

Furthermore, the power regulating device can regulate the requirement shares of the required means by way of the respective educts of the energy sources 3, 6, 4, 7. For example, the power regulating device 1 can provide a certain quantity of educts to the fuel cell system 6 in order to obtain the necessary products or required means. The power regulating device 1 can, for example, by changing the $\lambda O2$-value or the ratio of provided oxygen to reacted oxygen, regulate the composition of the additional products. Furthermore, the respective operating characteristic of the fuel cell 6 can be specified to the power regulating device 1. Based on the operating characteristics the power regulating device 1 detects the temperature Tfc, the $\lambda O2$-value and the energy output Pfc at which the fuel cell 6 can generate a particular product quantity or a particular requirement share of a required means.

Likewise, the power regulating device 1 can measure the operating characteristic of the electrical power plant generator 7. Thus, depending on the power plant thrust, the environmental parameters such as, for example, altitude and ambient temperature and the actual shaft output used for generating electrical power, the power regulating device can calculate the electrical efficiency $\eta tw$ of the power plant. By means of controlling the shaft output used, the power regulating device 1 can, for example, regulate the electrical power provided by the power plant Ptw,max.

Furthermore, taking into account the operating characteristics of the first and second energy sources 3, 4, the power regulating device can supply a required means to the consumer 2, 5 with the highest efficiency. Based on the power regulating device 1 knowing the operating characteristics of the energy sources 3, 4, for the purpose of generating a required means or a requirement share, that energy source 3, 4 can be selected or that requirement share can be increased which under the given circumstances achieves the best efficiency $\eta$. In this way a mixture of first and second requirement shares of first and second energy sources 3, 4 is created, which energy sources 3, 4 under the given circumstances most efficiently generate a required means.

If, for example, a certain quantity of thermal energy is required for a wing anti-icing system 11, the power regulating device can either take a particular share of thermal energy from the fuel cell 6, or can remove a certain requirement share as bleed air from the power plants, and feed it to the wing anti-icing system 11.

Figure 2:
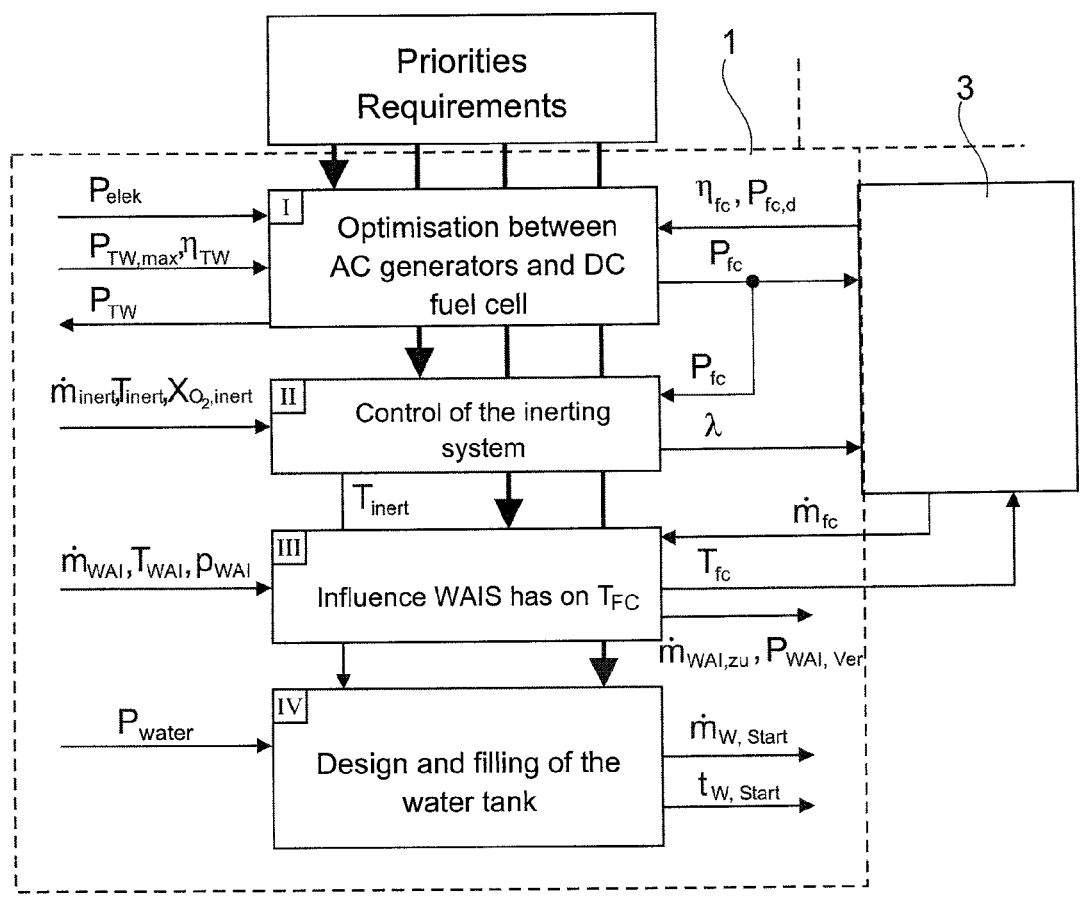
FIG. 2 an exemplary embodiment of a prioritization of various consumers according to an exemplary embodiment of the power regulating device.

FIG. 2 shows an exemplary embodiment of the interaction of the individual consumer systems 2, 5 that can be classified under blocks I to IV. The power regulating device 1 is located at the interface between the individual requirements of the consumers 2, 5, the priorities of the individual required means and the electrical power sources 3, 4. For example, if, as shown in FIG. 2, an energy source 3 is a fuel cell 6, then the power regulating device 1 regulates the use of the fuel cell products or of the required means such as electrical power, thermal energy, water and low-oxygen outgoing air, the so-called inert gas. The individual uses of the required means, or the supply of the required means to particular consumers 2, 5 can be prioritized. For example, the fuel cell products or the required means can be divided and allocated according to the priorities allocated to the consumers 2, 5.

In addition, the power regulating device 1 takes into account the operating characteristics of the energy sources 3, 4, as well as of the interactions between educts and products of the energy sources 3, 4. FIG. 2 shows, for example, 4 blocks Ito IV, relating to the use of the fuel cell products or of the required means. Firstly, in block I, for example the energy administration can be ensured. By means of the power regulating device 1, taking into account the respective operating characteristics, the alternating-current generators and direct-current generators, like fuel cells, may be regulated in an optimum manner. For example, the power regulating device 1 can first measure the requirement of electrical power Pelek. At the same time the power regulating device recognizes the available electrical power Ptw,max, for example of a power plant generator 7, and the electrical efficiency or the operating characteristic of the power plant generator $\eta tw$. With reference to these values the power regulating device recognizes the extent of the electrical power Ptw which the power plant generator can still provide in order to cover the requirement of a required means, in the present case electrical power. Correspondingly, the power regulating device 1 recognizes the electrical efficiency 11 fc and the electrical power Pfc,d of the fuel cell system 6. With reference to the requirement share of electrical power of the power plant 7 and of the fuel cell 6, the power regulating device 1 can then provide the requirement to a consumer 2, 5.

In block II, for example, regulation of an inerting system 8 and interaction with other consumers can be acquired. With reference to the input data of the inerting system 8, for example of the mass flow of the temperature Tinert and the oxygen content XO2, inert, the power regulating device 1 detects the amount of low-oxygen air that has to be made available to the inerting system. In line with this requirement, the power regulating device 1, for example, can, for example, set the O2-value of the fuel cell 6. By varying the air supply of the fuel cell system, for example by regulating the compressor 13, the power regulating device 1 can thus regulate the oxygen concentration of the low-oxygen outgoing air of the fuel cell 6.

In block III, for example, the wing anti-icing system 11 (WAIS) of an aircraft can be operated. The power regulating device 1 can, for example, measure the required means of the wing anti-icing system 11, for example the mass flow, the temperature TWAI and the pressure pWAI of the heat medium of the wing anti-icing system 11. Corresponding to this requirement of required means, the power regulating device 1 can, for example, take hot air from the fuel cell system 6 or bleed air from the power plants 7, depending on which energy source 3, 4, taking into account its operating characteristic, will provide the best efficiency.

Block IV represents the design and filling of a water tank. The power regulating device 1 knows practically all the tank resources of a water system in an aircraft, and, by measuring consumption and the fill level of such water tanks at departure, can determine the requirement of the required means water. Subsequently the power regulating device 1 can, for example, feed water, which is a product of the fuel cell, from the fuel cell system 6 to the water system 12.

The blocks I to IV can, for example, be served in succession by the power regulating device 1, so that the requirements of the higher-ranking consumer systems are met first.

Figure 3:
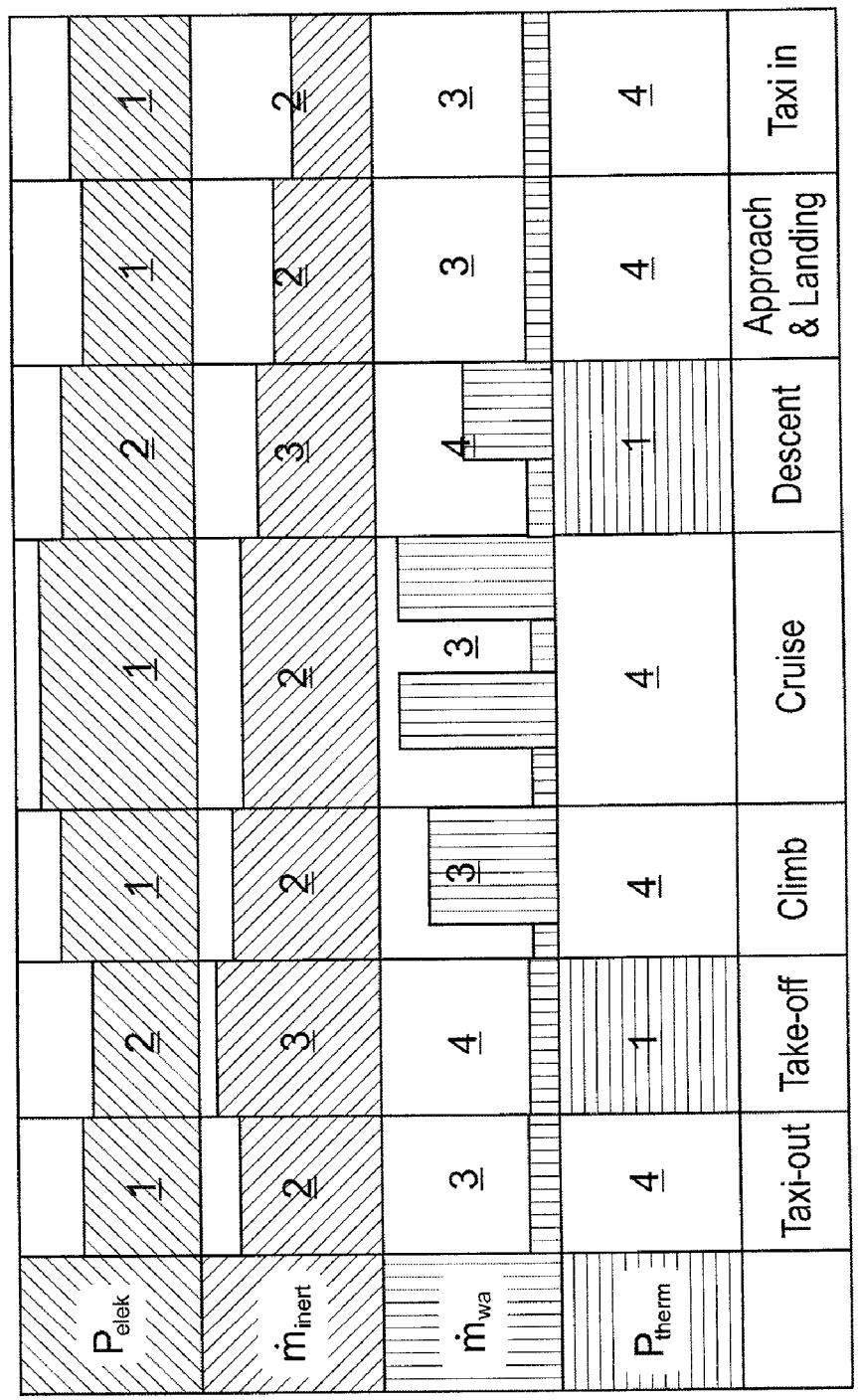
FIG. 3 an exemplary view of priority allocation according to individual flight phases according to an exemplary embodiment of the power regulating device.

FIG. 3 shows an exemplary embodiment of an exemplary priority list. The priority list may be activated in an emergency when an energy source 3, 4, for example the fuel cell, is no longer 100% available, thus ensuring that an adequate quantity of required means can be made available to individual consumers. FIG. 3 shows, for example, the requirements and the priority of the consumers 2, 5 of an energy source 3, 4, in the present case the electrical system 9, 10, the WAI-system 11, the inerting system 8 and the water system 12 of a fuel cell system depending on flight phases. For example, the following flight phases can be distinguished: taxi-out, take-off, climb, cruise, descent, approach and landing, and taxi-in.

For example, flight safety is accorded the highest priority. Flight safety is, for example, characterized by ensuring the supply of electrical power to the flight controls, and therefore the required means electrical power (Pelek) of the electrical system 9, 10 has the highest level of priority. During climb and descent, flight safety may be jeopardized by the danger of the leading edges of the wings icing up. Therefore in this case the supply of thermal energy (Ptherm) of the WAI system is accorded the highest priority. When the WAI system 11 is not used it has no priority and thus ranks last on the priority list.

The required means low-oxygen outgoing air ( ) of the inerting system 8 is on the third priority level because it is not ranked above ensuring general flight safety. During the flight phases in which the WAI system is not used (i.e., has the lowest level of priority), the low-oxygen outgoing air for the inerting system 8 ranks second in the list of priorities.

Functional readiness of the water system 12 is not necessary for general flight safety; it only serves to ensure the comfort and the provision of service to passengers.

This leads to the required means water being accorded the lowest rank of the operating consumers in the priority list.

Figure 4:
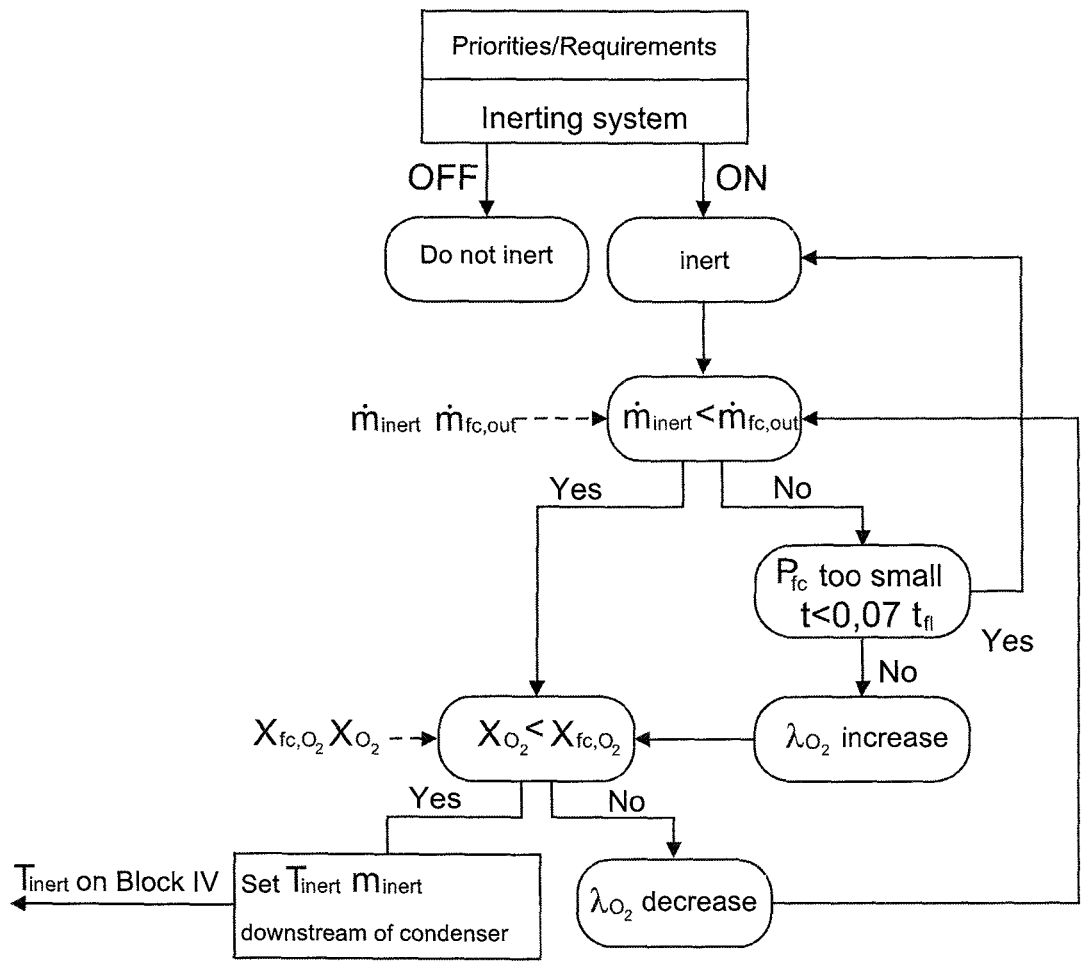
FIG. 4 an exemplary view of a switching circuit logic of the power regulating device according to an exemplary embodiment.

FIG. 4 shows an exemplary switching circuit logic of the power regulating device 1 in the context of an inerting system 8. With reference to the readings of the oxygen concentration in spaces where there is a risk of fire, the power regulating device 1 can first decide whether or not inerting is to take place. If inerting is to take place, the power regulating device 1 first determines whether the air mass flow of the fuel cell 6 exceeds the required air mass flow for inerting the space. If the fuel cell system 6 is able to provide the required air mass flow, then in the next step a check is made whether the required oxygen content XO2 in the outgoing air from the fuel cell is sufficiently low for inerting. If the oxygen concentration XO2 is sufficiently low for inerting a region, then the power regulating device 1 feeds the air mass flow at the temperature Tinert into the inerting system.

If the power regulating device 1 detects an insufficient air mass flow from the fuel cell system 6, the output of the fuel cell 6 has to be increased. As set out in provisions of the aviation regulation authorities, for example in JAA25.1309, an inerting system may be interrupted only for less than 7% of the duration of flight so as to prevent jeopardizing inerting of the fuel tanks; in other words the oxygen content in the fuel tanks must not exceed a prescribed value. If the time span exceeds the 7% mark, the air mass flow and the oxygen content $Xfc,O2$ and consequently the output Pfc can be increased. The power regulating device 1 can regulate this, for example by way of controlling the $\lambda O2$-value. Downstream of a condenser for separating condensation water, and after setting the temperature of the outgoing air from the fuel cell, the consumer 2, 5 to be inerted can be inerted with inert gas or with low-oxygen air. The collected condensation water can, for example, be supplied to the water system.

Figure 5:
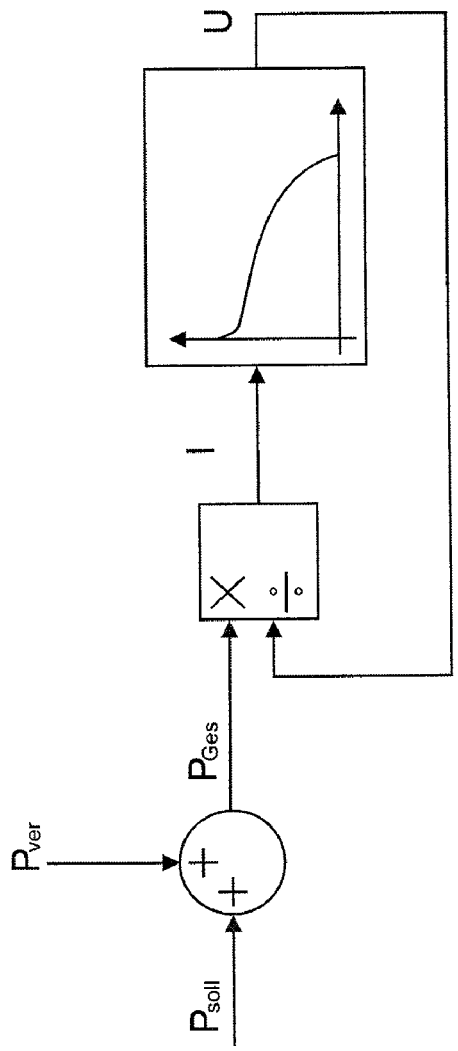
FIG. 5 an exemplary view of an output regulation of the power regulating device according to an exemplary embodiment.

FIG. 5 shows an exemplary view of the flexible determination of an operating characteristic of an energy source 3, 4 by means of the power regulating device 1. A fuel cell system 6 is used as an example. Based on particular framework data relating to the fuel cell 6 the various educt quantities of the fuel cell system can be defined in advance. For example, the operating characteristic of a fuel cell system 6 predetermines, for example, a preferred value of $\lambda O2$, in the present example $\lambda O2=2$. This means that, for example, according to the definition of the $\lambda$-value, double the quantity of oxygen is provided than reacts in the electrochemical reaction.

The power regulating device 1 determines the net system output as a regulating variable, which regulating variable results from the requirement or requirement share of a required means. The net system output is thus the desired value that the fuel cell or the energy source 3, 4 is to attain. In addition to the setpoint output PSoll, furthermore the loss output PVer is added, which results, for example, from the use of compressors 13 or similar additional devices. The overall output PGes to be achieved in this way is used by the power regulating device 1 as the desired value.

Output regulation to achieve the setpoint output PSoll is, for example, implemented as an algebraic loop. An algebraic loop is a signal loop that comprises inputs with direct feedthrough. If the change in the input signal of the algebraic loop directly influences the input signal again, this is referred to as "direct feed-through" which is shown in FIG. 5. As a starting value for the algebraic loop, the quotient of the setpoint value PGes and the actual cell voltage U of the fuel cell system 6 is formed. This starting value determines the current density for the indicated cell voltage. The new current density results in a different operating point in the U/I characteristic of the fuel cell, and the newly calculated cell voltage instructs the next loop. The algebraic loop sets the corresponding operating point in the U/I-characteristic of the fuel cell for the desired system output. Thus the power regulating device 1 can permanently determine the operating characteristic or the operating point of an energy source 3, 4, in the present example of the fuel cell 6.

The power regulating device 1 controls the educt supply of the energy sources 3, 4. In the case of a fuel cell 6 a compressor 13 is the determining factor as far as the dynamic or the variability of the fuel cell output is concerned, because in this way the $\lambda O2$-value for optimum and efficient operation of the fuel cell can be regulated. The $\lambda O2$-value is directly correlated to the mass flow from the compressor. The motor voltage of the compressor drive can thus be selected as the controller output u(t).

Figure 6:
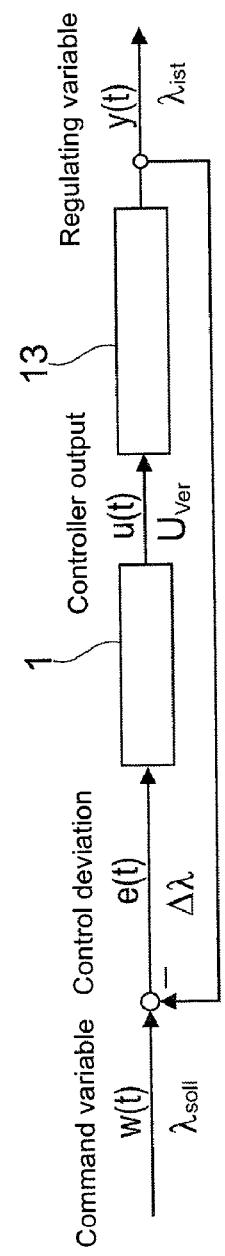
FIG. 6 an exemplary view of a control circuit of a fuel cell system.

FIG. 6 shows an exemplary control circuit of a fuel cell system 6, comprising a fuel cell and a compressor 13. The $\lambda O2$-value represents the regulating variable y(t) of the fuel cell system 6. The setpoint value of the $\lambda O2$-value is defined as the command variable w (t). By means of the resulting control deviation e(t), the regulator specifies to the power regulating device 1, on the basis of its regulator rules, a controller output u(t) for the controlled member, which controller output u(t) counteracts the control deviation that has occurred. The motor voltage UVer of the compressor 13 represents the controller output u(t) for the controlled member, compressor 13 and fuel cell 6. If there is a change in the required quantities of the required means, for example in the requirement of low-oxygen outgoing air or in the energy requirement, the power regulating device 1, as shown above, can control or regulate the motor of the compressor and can thus control the required quantity of the products of the fuel cell.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. An energy system for an aircraft, comprising:
a first energy source with a first operating characteristic;
a second energy source with a second operating characteristic;
a consumer that has a required means for the operation of the consumer; and
a power regulating device in communication with the first energy source and the second energy source to determine the first operating characteristic and the second operating characteristic, and the power regulating device measures a requirement of the required means of the consumer, controls the first energy source to generate a first requirement share of the required means based on the first operating characteristic and controls the second energy source to generate a second requirement share of the required means based on the second operating characteristic, with the first requirement share and the second requirement share making up the required means for the operation of the consumer,
wherein the first operating characteristic and the second operating characteristic change based on the flight phase of the aircraft.

2. The power regulating device of claim 1 wherein the power regulating device measures a second requirement for a second required means of a second consumer, and controls the first energy source and the second energy source depending on the first operating characteristic and on the second operating characteristic such that the second required means is provided to the second consumer.

3. The power regulating device of claim 2 wherein the power regulating device assigns a priority to the consumer and to the second consumer, and depending on the priority, the required means or second required means is supplied to the respective one of the consumer and the second consumer.

4. The power regulating device of claim 3, wherein the power regulating device assigns the priority based on flight safety aspects.

5. The power regulating device of claim 1, wherein the power regulating device is designed to control educts from one of the first energy source and the second energy source in order to control the first requirement share generated by the first energy source and the second requirement share generated by the second energy source.

6. The power regulating device of claim 1, wherein the required means is selected from a group comprising: electrical power and an additional product; and
wherein the additional product is selected from the group comprising: water, thermal energy and low-oxygen outgoing air.

7. The power regulating device of claim 1, wherein at least one of the first energy source or the second energy source further comprises a fuel cell system.

8. The power regulating device of claim 7, wherein the fuel cell system further comprises a compressor that regulates an air supply or an oxygen supply of the fuel cell system and the power regulating device regulates the compressor.

9. The power regulating device of claim 1, wherein at least one of the first energy source and of the second energy source further comprises an engine generator.

10. The power regulating device of claim 1, wherein at least one of the first energy source and of the second energy source is further selected from a group comprising: batteries, electrical direct-current generators, electrical alternating-current generators, storage batteries and solar cells.

11. The power regulating device of claim 2, wherein the consumer and second consumer are selected from a group comprising: electrical direct-current systems, electrical alternating-current systems, water consumers, inerting systems and de-icing systems.

12. A method for regulating hybrid energy sources for an aircraft, comprising:
measuring the requirement of a required means of a consumer with a power regulating device;
determining a first operating characteristic of a first energy source and a second operating characteristic of a second energy source with the power regulating device;
generating a first requirement share of the required means with the first energy source and a second requirement share of the required means with the second energy source;
regulating the first energy source and the second energy source with the power regulating device such that depending on the first operating characteristic and on the second operating characteristic the first requirement share and the second requirement share of the required means are provided to the consumer; and
determining the first operating characteristic and the second operating characteristic depending on a flight phase of the aircraft with the power regulating device.

13. An energy system for an aircraft comprising:
a first energy source;
a second energy source;
a power regulating device that measures a requirement of a required means of a consumer and determines;
a first operating characteristic of the first energy source and a second operating characteristic of the second energy source depending on the actual flight phase of the aircraft and controls
the first energy source and the second energy source depending on the first operating characteristic and on the second operating characteristic such that the first requirement share and the second requirement share of the required means is provided to the consumer.

14. An energy system for an aircraft, comprising:
a fuel cell system with a first operating characteristic;
a second energy source with a second operating characteristic;
a first consumer that has a first electrical power requirement for the operation of the first consumer;
a second consumer that has a second electrical power requirement for the operation of the second consumer;
a power regulating device in communication with the fuel cell system and the second energy source to determine the first operating characteristic and the second operating characteristic, and the power regulating device measures the electrical power requirement of the first consumer and second consumer, controls the fuel cell system based on the first operating characteristic to generate a first requirement share of the first electrical power requirement and controls the second energy source based on the second operating characteristic to generate a second requirement share of the first electrical power requirement, with the first requirement share and the second requirement share being provided to the first consumer to supply the first consumer with the first electrical power requirement, and the power regulating device controls the fuel cell system based on the first operating characteristic to generate a third requirement share of the second electrical power requirement and controls the second energy source based on the second operating characteristic to generate a fourth requirement share of the second electrical power requirement, with the third requirement share and the fourth requirement share being provided to the second consumer to supply the second consumer with the second electrical power requirement, wherein the power regulating device prioritizes the supply of the first electrical power requirement and second electrical power requirement based on a flight phase of the aircraft.

* * * * *